US007923601B2

(12) United States Patent
Suzuki (10) Patent No.: US 7,923,601 B2
(45) Date of Patent: Apr. 12, 2011

(54) CULTIVATION METHOD OF FLOWERING PLANT, FLOWERING PLANT OBTAINED BY THE CULTIVATION METHOD, PROCESSING METHOD OF CUT FLOWER AND CUT FLOWER OBTAINED BY THE PROCESSING METHOD

(76) Inventor: Hirohito Suzuki, Maruyama-machi (JP)

( * ) Notice: Subject to any disclaimer, the term of this patent is extended or adjusted under 35 U.S.C. 154(b) by 845 days.

(21) Appl. No.: 10/593,647

(22) PCT Filed: Mar. 11, 2005

(86) PCT No.: PCT/JP2005/004343
§ 371 (c)(1),
(2), (4) Date: Apr. 9, 2007

(87) PCT Pub. No.: WO2005/092078
PCT Pub. Date: Oct. 6, 2005

(65) Prior Publication Data
US 2008/0235832 A1    Sep. 25, 2008

(30) Foreign Application Priority Data

Mar. 25, 2004  (JP) ................................ 2004-089194
May 19, 2004  (JP) ................................ 2004-148775

(51) Int. Cl.
*A01H 5/00* (2006.01)
(52) U.S. Cl. ........................................................ 800/298
(58) Field of Classification Search .................. 800/298, 800/323, 320.1; 47/58.1 R, 58.1 CF; Plt./272–383; 435/69.1
See application file for complete search history.

(56) References Cited

U.S. PATENT DOCUMENTS

PP12,670 P2 *  6/2002  Klemm ........................ Plt./279
(Continued)

FOREIGN PATENT DOCUMENTS

JP           05219849 A  *  8/1993 .................... 435/69.1

OTHER PUBLICATIONS

Database Biosis [Online]. XP002486134. Tronchet, J. (1975). *Effects of precocious calyx ablation on growth and flavonic compounds of paeonia-suffruticosa and rosa-rugosa corollas*. Biosciences Information Service, Philadelphia, PA, US. Database accession No. PREV197662010492 *abstract* & Bulletin de la Societe Botanique de France, vol. 122, No. 7-8, pp. 259-267, ISSN: 0037-8941.

(Continued)

*Primary Examiner* — Kent L Bell
(74) *Attorney, Agent, or Firm* — The Nath Law Group; Jerald L. Meyer; Sungyeop Chung (57) ABSTRACT

The present invention relates to making it possible to cultivate a new flowering plant that meets the needs of the flower market, namely, a flower having a unique color, a new type of flower and the like. The present invention also relates to making it possible to process a cut flower that meets the needs of the flower market, namely, a cut flower having a unique color or a new type of cut flower. By releasing the restraint on the floral bud imposed by the outermost layer of the floral bud, the present invention provides a cultivation method of a flowering plant having a unique appearance, a flowering plant obtained by the cultivation method, a processing method of a cut flower having a unique appearance and a cut flower obtained by the processing method. The present invention further provides a chlamydeous flowering plant and a cut chlamydeous flower in each of which the restraint on the floral bud imposed by the outermost layer of the floral bud is released.

14 Claims, 13 Drawing Sheets

U.S. PATENT DOCUMENTS 7,241,941 B1 * 7/2007 Horejsi et al. ............. 800/320.1

OTHER PUBLICATIONS

Database Biosis [Online]. XP002486135. Bird et al. (1987). *Feeding deterrent compounds to the boll weevil anthonomus-grandis boheman in rose-of-sharon Hibiscus-syriacus L.* Biosciences Information Service, Philadelphia, PA, US. Database accession No. PREV198784034286 *abstract* & Journal of Chemical Ecology, vol. 13, No. 5, pp. 1087-1098, ISSN: 0098-0331.

Database Biosis [Online]. XP002486136. Ganelevin et al. (Jul. 2002). *Contribution of sepals and gibberellin treatments to growth and development of rose (Rosa hybrida) flowers.* Biosciences Information Service, Philadelphia, PA, US. Database accession No. PREV200300066469 *abstract* & Plant Growth Regulation, vol. 37, No. 3, pp. 255-261. ISSN: 0167-6903.

* cited by examiner

6 — PETALS 2 (PALE YELLOW)

(c)

(d)

(e)

6 — PETALS 2 (PALE YELLOW)
5 — PETALS 1 (PINK)

5
PETALS 1
(PINK)

(c)

(d)

(e)

5
PETALS 1 (PINK)

6 PETALS 2 (PALE YELLOW)
5 PETALS 1 (PINK)

5
PETALS 1 (PINK)

CULTIVATION METHOD OF FLOWERING PLANT, FLOWERING PLANT OBTAINED BY THE CULTIVATION METHOD, PROCESSING METHOD OF CUT FLOWER AND CUT FLOWER OBTAINED BY THE PROCESSING METHOD

TECHNICAL FIELD

The present invention relates to a cultivation method of a flowering plant having a new appearance based on a simple and easy method, a flowering plant obtained by the cultivation method, a processing method of a cut flower having a new appearance based on a simple and easy method, and a cut flower obtained by the processing method.

BACKGROUND ART

In recent years, gardening and flower arrangement have become popular, a large number of associated publications such as books and journals even for common readers have been published, and numerous flower arrangement classes and contests have been held. Such circumstances result in various needs in the flower market in such a way that various types of flowering plants are demanded.

Among a huge variety of flower plants, *Dianthus caryophyllus* (carnation) is widely used in bouquets and in flower arrangement and is proudly enjoying the second place in shipment amount with the first place won by chrysanthemum (according to the 2002 statistics by the Ministry of Agriculture, Forestry and Fisheries of Japan). Carnation is such a familiar flower as described above. On the other hands, carnation encounters demand for the various breeds including: new breeds unique in color and novel in type; breeds resistant to wilt; breeds free from calyx splitting and capable of being shipped in a period where the unit price thereof is high; and breeds allowing ample annual harvesting of flowers; and early season spray breeds.

Accordingly, for the purpose of meeting the various needs in the market, breed improvement based on hybridization and the like has been widely practiced. Examples of such breed improvement include a case where a transgenic carnation plant having a flower color modified by using biotechnology (see National Publication of International Patent Application No. 11-505116).

DISCLOSURE OF THE INVENTION

In the flower market, needs for flowers other than carnation as well as needs for carnation become various in such a way that flowers having unique color or new types of flowers have been demanded.

Accordingly, the present invention provides a cultivation method of a flowering plant which method grows a flowering plant by using a method that is simple and easy but never has been developed, a flowering plant obtained by the cultivation method, a processing method of a cut flower which method processes a cut flower by using a method that is simple and easy but never has been developed, and a cut flower obtained by the processing method.

The cultivation method of a flowering plant and the processing method of a cut flower of the present invention are characterized in that the restraint on a floral bud imposed by the outermost layer of the floral bud is released at a stage between immediately after the floral bud initiation and the flowering period thereof.

The flowering plant of the present invention is obtained by the above described cultivation method of a flowering plant according to the present invention.

Another flowering plant of the present invention is characterized in that the restraint on the floral bud imposed by the outermost layer of the floral bud is released.

The cut flower of the present invention is obtained by the above described processing method of a cut flower according to the present invention.

Another cut flower of the present invention is characterized in that the restraint on the floral bud imposed by the outermost layer of the floral bud is released.

Additionally, on the basis of the above described cultivation method and the above described processing method, it is possible to obtain a flower flowering in multiple colors that are different between the central portion and the outer portion, by releasing the restraint on the floral bud imposed by the outermost layer of the floral bud at an appropriate timing within the stage of being a floral bud.

The appropriate timing within the stage of being a floral bud is preferably a timing before the petals are exposed.

By releasing the restraint on the floral bud imposed by the outermost layer of the floral bud at a stage between immediately after the floral bud initiation and the flowering period thereof in the cultivation of a flowering plant and the processing of a cut flower, the basal portions of the petals are no longer constricted by the outermost layer of the floral bud to release the petals, and thus there are achieved a cultivation of a flowering plant and a processing of a cut flower, wherein a flowering plant and a cut flower each have a flower having an appearance unattainable by conventional cultivation methods. In the present invention, such a way of flowering into such a flower as described above is defined as "release flowering."

According to the method of the present invention, the size of a flower becomes larger and the color of the flower acquires a variety.

BRIEF DESCRIPTION OF THE DRAWINGS

FIG. 1(*a*) shows a structure of a chlamydeous flower (carnation) having a calyx which is located adjacent to a corolla. FIG. 1(*b*) schematically shows a structure of a chlamydeous flower (*camellia*) having sepal-like involucral bracts which are located adjacent to a corolla.

FIG. 2(*a*) schematically shows for carnation an example of the state of a flower in which all the sepal lobes are removed. FIG. 2(*b*) schematically shows for carnation an example of the state of a flower in which a plurality of splitting incisions are made in the calyx. FIG. 2(*c*) schematically shows for carnation an example of the state of a flower in which the sepal lobes are opened. FIG. 2(*d*) schematically shows for *camellia* an example of the state of a flower in which all the involucral bract lobes are removed.

DETAILED DESCRIPTION

An example of a flower to be the subject of the present invention is a chlamydeous flower having a calyx which is located adjacent to a corolla.

Figure 1:
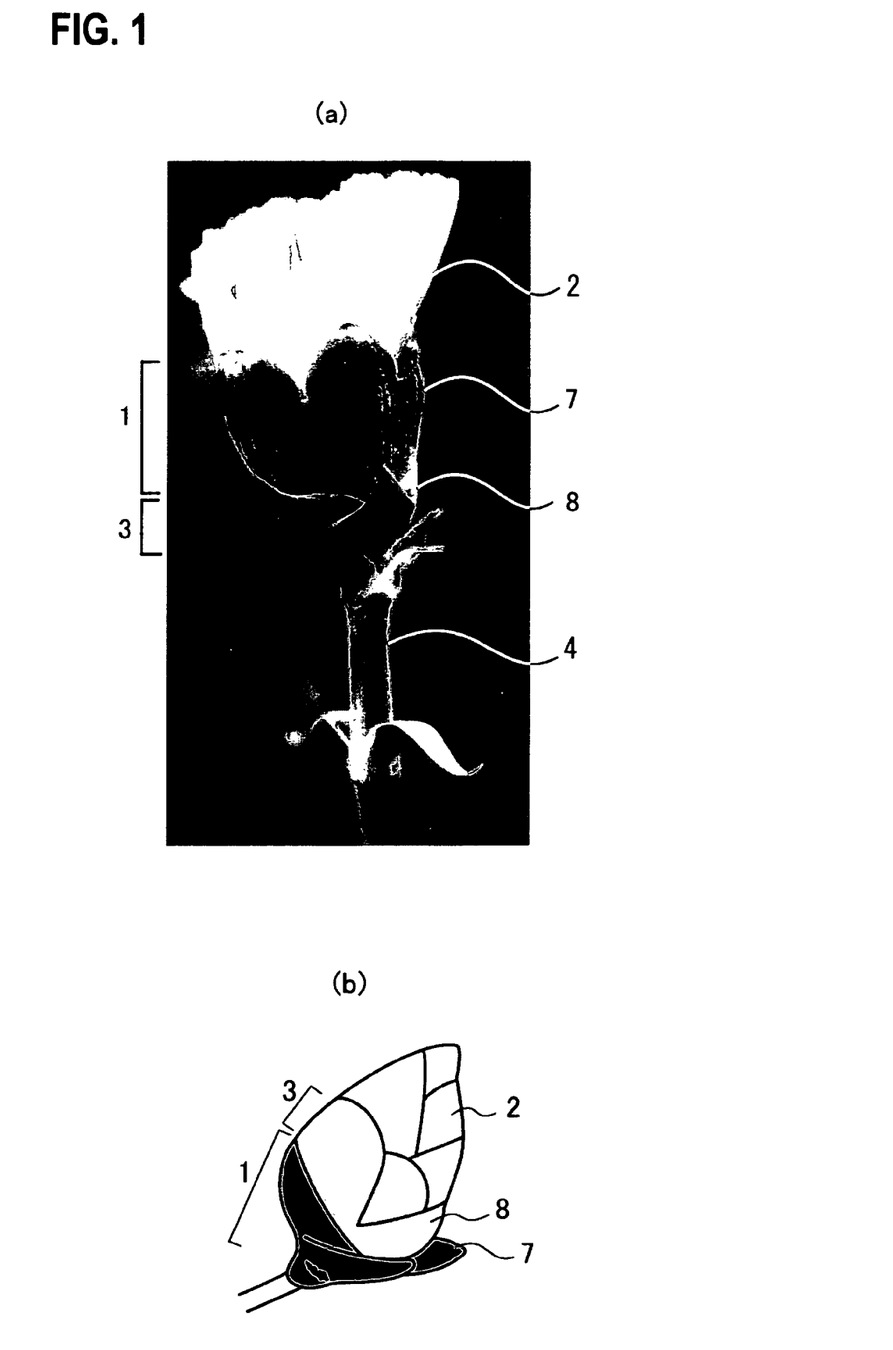

Specifically, an example of a flower to be the subject of the present invention is a flower which, for example, as shown in FIG. 1(a), has a structure in which a calyx 1 is located between a petal 2 and sepal-like involucral bracts 3, the calyx 1 protects a floral bud so as to cover the floral bud, and a perianth is connected to a flower stalk 4. In this case, the outermost layer of the floral bud is the calyx 1.

Examples of the flowers having such a structure may include the flowers of Caryophyllaceae, Rosaceae and Compositae families.

Specific examples of such flowering plants may include *Dianthus, Rosa, Dahlia* and *Paeonia* genera. However, the flowers to be the subjects of the present invention are not limited to these examples.

Another example of a flower to be the subject of the present invention includes chlamydeous flower having sepal-like involucral bracts which are located adjacent to a corolla.

Specifically, another example of a flower to be the subject of the present invention is a chlamydeous flower which, for example, as shown in FIG. 1(b), has a structure in which the sepal-like involucral bracts 3 are located between the petals 2 and the calyx 1, and the sepal-like involucral bracts 3 protect a floral bud so as to cover the floral bud. In this case, the outermost layer of the floral bud is composed of the sepal-like involucral bracts 3.

Examples of the flowers having such a structure may include the flowers of Theaceae family.

Specific examples of such flowering plants may include *Camellia, Anemone* and *Ranunculus* genera. However, the flowers to be the subjects of the present invention are not limited to these examples.

The inflorescences of the flowers to be the subjects of the present invention may be solitary, racemiferous, spicate or of any other type. For example, as for carnation, the inflorescence may be any of the standard, spray and border-flowering varieties.

In the present invention, a "cut flower" refers to a cut flower that is obtained by cutting after the floral bud initiation, namely, after the floral budding.

In the present invention, the "flowering period" refers to the period before the "Pre-Harvest Stage 6" as described in the book "Hana No Kirimae" (edited by Florist Editorial Department, Seibundo Shinkosha Inc., 1994).

The "Pre-Harvest Stage" is an index for a cut flower indicating the flowering level at the time of the flower harvesting or shipping carried out by a flower grower; the "Pre-Harvest Stage," namely, the timing of flower harvesting is determined by the flower grower in such a way that the quality and the longevity of a flower may be maintained when a consumer purchases the flower, in consideration of the flowering stage to be advanced depending on the distance to the market and the temperature at the time of transportation.

According to "Hana No Kirimae" (edited by Florist Editorial Department, Seibundo Shinkosha Inc., 1994), the "Pre-Harvest Stage" includes 6 stages, namely, "Pre-Harvest Stage 1" to "Pre-Harvest Stage 6." These six stages are defined as follows in consideration of the degree of flowering at the time of the arrival of the flower to the market.

Figure 7:
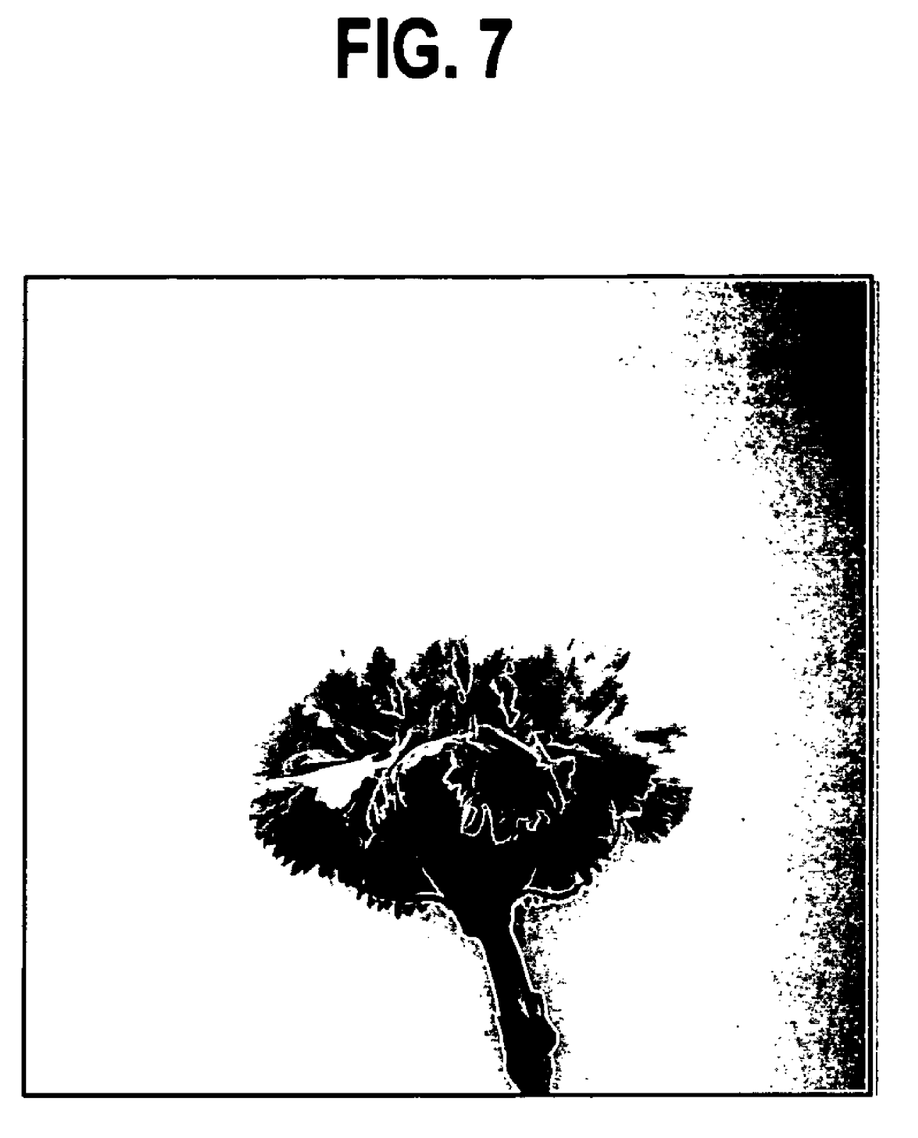
FIG. 7 shows a lateral view of the flowering state of the flower of FIG. 6.

"Pre-Harvest Stage 1": floral buds are too immature and not suitable for shipping in any season "Pre-Harvest Stage 2": floral buds are still immature but may be suitable for shipping depending on the season or market preferences "Pre-Harvest Stage 3": suitable for shipping; slightly early harvest "Pre-Harvest Stage 4": suitable for shipping; standard harvest "Pre-Harvest Stage 5": suitable for shipping; slightly late harvest "Pre-Harvest Stage 6": flowers are too open, but may be suitable for shipping depending on the season or market preferences As for carnation, for example, "Pre-Harvest Stage 6" indicating the terminal period of the flowering period in the present invention corresponds to the degree of flowering development as shown in FIG. 7.

The flowers of flowering plants are usually covered to be protected, in the floral bud stage, with a calyx or sepal-like involucral bracts, namely, the outermost layer of the floral bud. This protection serves to prevent young floral buds from damage caused by impact exerted from the outside. However, the plants consume large amounts of nutrition and energy for this purpose.

When a calyx or sepal-like involucral bracts, namely, the outermost layer of a young floral bud is removed from the young floral bud, the attack from the outside cannot be prevented, but the nutrition and energy to be otherwise used for prevention are devoted to the corolla to conceivably provide an advantage such that the petals become thicker or the size of the corolla becomes larger.

Additionally, by releasing the restraint on the floral bud imposed by the outermost layer of the floral bud, the basal portions of the petals are no longer constricted by the outermost layer of the floral bud, the petals are opened with an opening length increment corresponding to the length of the outermost layer of the floral bud, thus the size of the portion corresponding to the corolla becomes larger, and further, the opening angle of the petals also become larger.

Examples of the methods for releasing the restraint on the floral bud imposed by the outermost layer of the floral bud may include the following methods: (1) a method in which the outermost layer of the floral bud is removed, (2) a method in which splitting incisions are made in the outermost layer of the floral bud, and (3) a method in which the outermost layer of the floral bud is opened; according to any of these methods, the petals are released ("release flowering"), and the way of flowering becomes various. The cultivation method of a flowering plant in the present invention includes any of these methods or any of combinations of these methods.

For these methods, tools may or may not be used; however, tools make the operations involved quicker, and simpler and easier. For example, tools for removing the outermost layer of the floral bud are recommended to be tweezer-like or hair tweezer-like tools that permit removing only the outermost layer of the floral bud without damaging the inside petals and the like.

In the present invention, "removing the outermost layer of the floral bud" includes any of the following cases or a combination of these cases when the outermost layer of a floral bud is a calyx: (1) a case where all the sepal lobes are removed; (2) a case where a part of a plurality of sepal lobes are removed; and (3) a case where each of the sepal lobes is not removed totally from the basal portion thereof but is removed partially from a midway position thereof.

FIG. 2(a) shows for carnation a state of a flower in which all the sepal lobes 7 are removed.

Further, in the present invention, "removing the outermost layer of the floral bud" includes any of the following cases or a combination of these cases when the outermost layer of a floral bud is composed of sepal-like involucral bracts: (1) a case where all the involucral bract lobes are removed; (2) a case where a part of a plurality of the involucral bract lobes are removed; and (3) a case where each of the involucral bract lobes is not removed totally from the basal portion thereof but is removed partially from a midway position thereof.

FIG. 2(d) shows for *camellia* a state of a flower in which all the involucral bract lobes 8 are removed.

In the present invention, "making splitting incisions in the outermost layer of the floral bud" includes the following cases: a case where the splitting incisions are made in the outermost layer of the floral bud along a direction parallel to the fiber of the outermost layer of the floral bud; and a case where the outermost layer of the floral bud is cut open. The number of the splitting incisions to be made is preferably two or more.

For example, when splitting incisions are made in the outermost layer of the floral bud, the incisions are preferably made so as to separate by incision the mutually contacting basal portions of the sepal lobes and the involucral bracts constituting respectively the calyx and the sepal-like involucral bracts, namely, the outermost layer of the floral bud.

Figure 2:
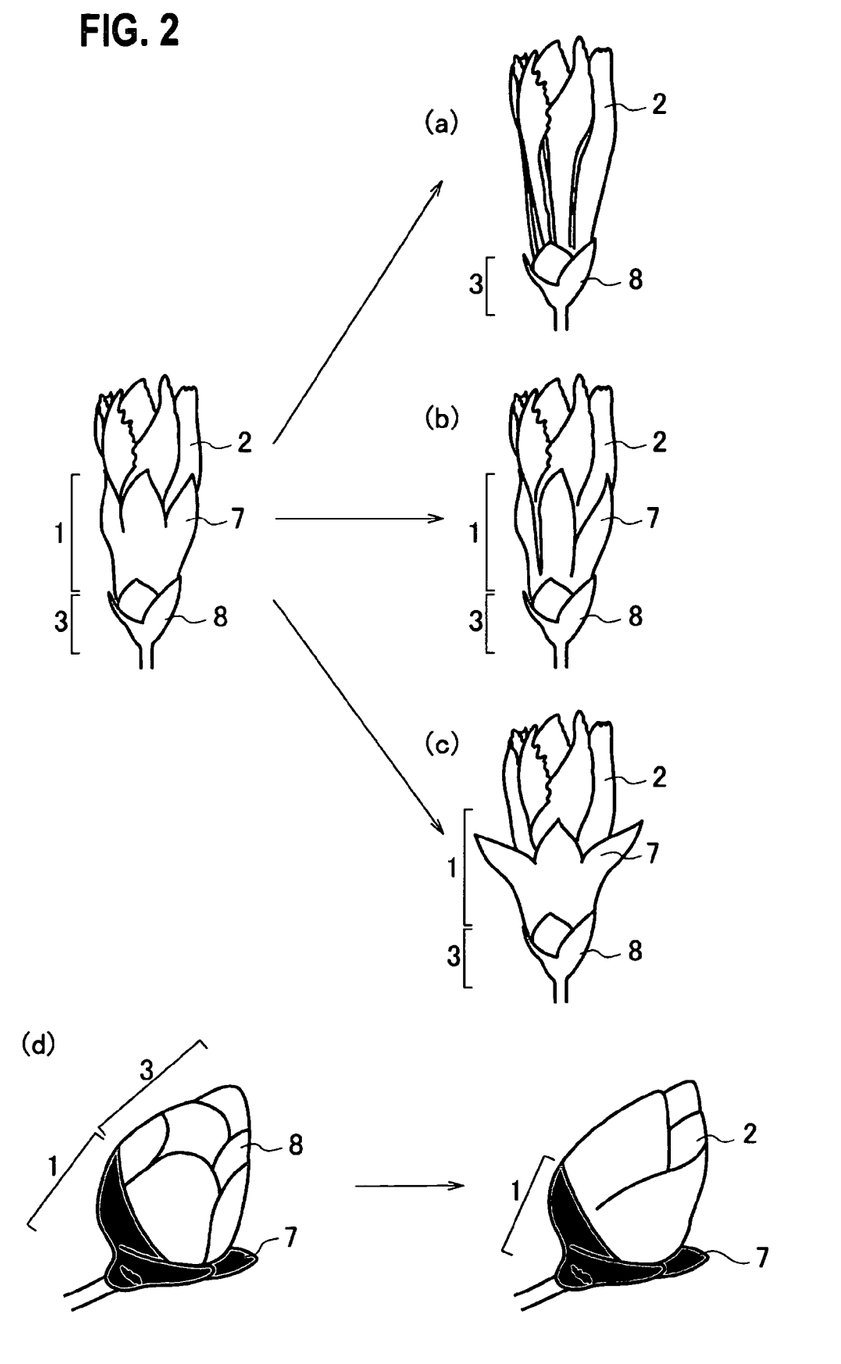

FIG. 2 (b) shows for carnation a state of a flower in the case where a plurality of splitting incisions are made in the calyx 1.

In the present invention, "opening the outermost layer of the floral bud" means that, without making incisions in the outermost layer of the floral bud, bending away from the center of the corolla is applied to the sepal lobes and the involucral bracts constituting respectively the calyx and the sepal-like involucral bracts, namely, the outermost layer of the floral bud.

For example, in the case of carnation, only the opening of the sepal lobes in a manner bending away from the center of the corolla, without cutting open the calyx or removing the sepal lobes, can release the restraint on the floral bud imposed by the sepal lobes, namely, the outermost layer.

FIG. 2(c) shows for carnation a state of a flower in which the sepal lobes 7 are opened.

For example, when a part of the plurality of sepal lobes are removed in such a way that the half of the sepal lobes are removed (by making two splitting incisions and removing one 180-degree half and leaving the other 180-degree half on), the corolla becomes asymmetric in shape to result in a "release flowering" achieved only on the side where the sepal lobes have been removed. Thus, a flower having a unique appearance can also be obtained.

Figure 6:
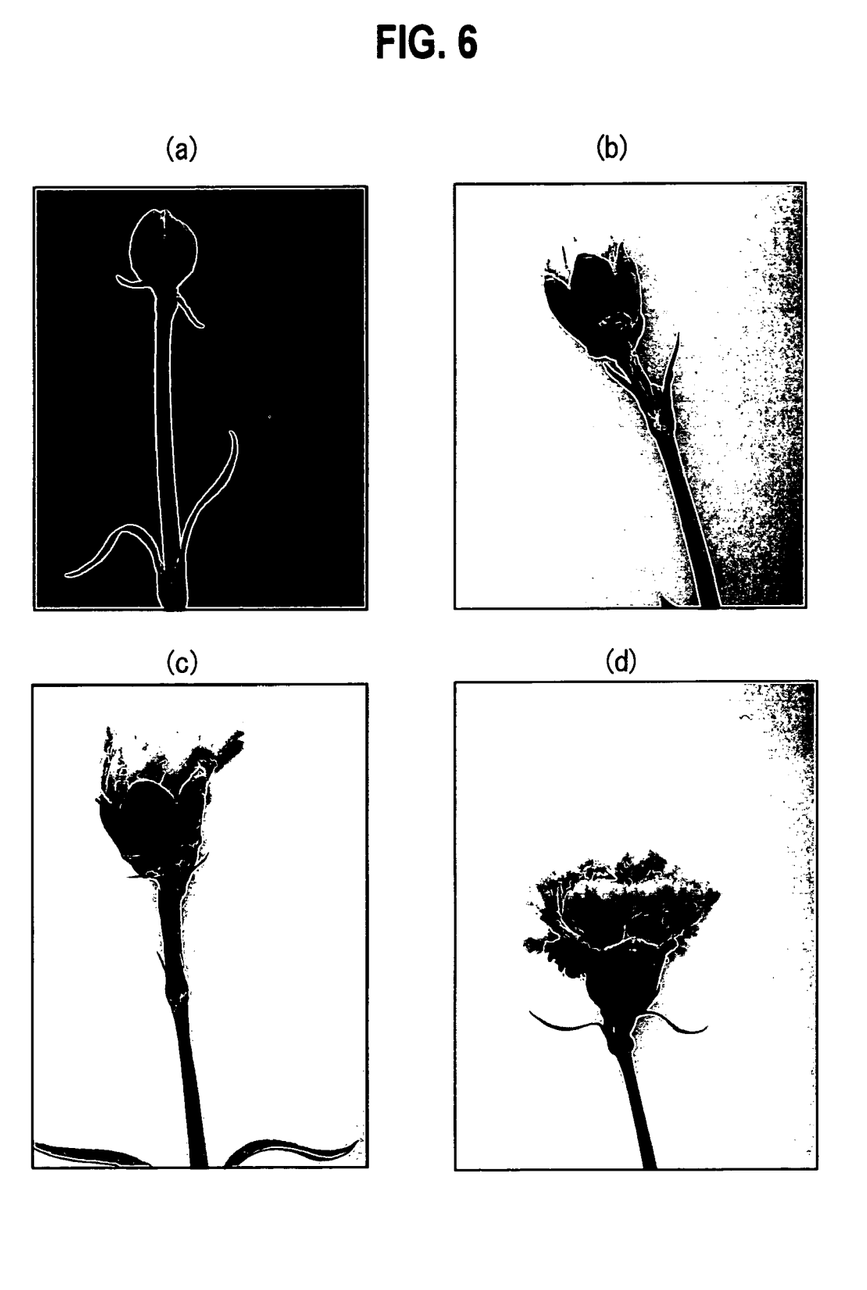
FIG. 6 shows lateral views showing the flowering development of a flower as a function of time in a case where no sepal lobes are removed in Comparative Example 1.

For the purpose of obtaining a flowering plant having a unique appearance by releasing the restraint on the floral bud imposed by the outermost layer of the floral bud, it is important to release the restraint imposed by the outermost layer at a stage between immediately after the floral bud initiation and the flowering period corresponding to the above described "Pre-Harvest Stage 6; even when the restraint imposed by the outermost layer is released after full flowering, namely, after passing through the "Pre-Harvest Stage 6" of the flowering period it is impossible to obtain a flowering plant with a flower having an appearance similar to the appearance of the present invention. The releasing stage is preferably set to be not later than the stage of FIG. 6(a) or (b), and more preferably not later than the stage of FIG. 6(a).

Figure 12:
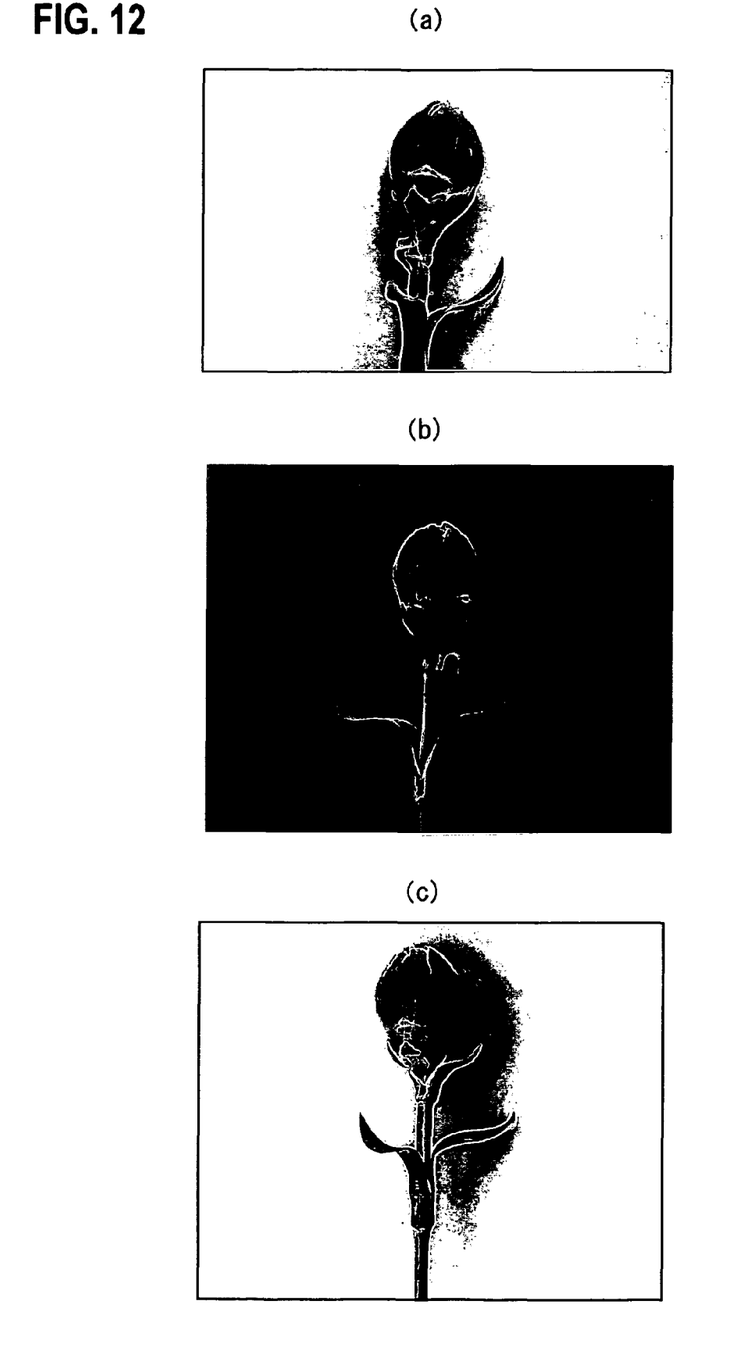
FIG. 12 shows lateral views showing the flowering development of a flower as a function of time in a case where no sepal lobes are removed in Comparative Example 2.

For the purpose of obtaining a cut flower having a unique appearance by releasing the restraint on the floral bud imposed by the outermost layer of the floral bud, it is important to release the restraint imposed by the outermost layer at a stage between immediately after the floral bud initiation and the flowering period corresponding to the above described "Pre-Harvest Stage 6; even when the restraint imposed by the outermost layer is released after full flowering, namely, after passing through the "Pre-Harvest Stage 6" of the flowering period, it is often impossible to obtain a cut flower with a flower having an appearance similar to the appearance of the present invention. The releasing stage is preferably set to be not later than the stage of FIG. 12(a), (b) or (c), more preferably not later than the stage of FIG. 12(a) or (b), and furthermore preferably not later than the stage of FIG. 12(a).

The processing of a cut flower of the present invention may be carried out immediately after the flower harvesting, or for example, even when the processing is carried out a few hours, a few days or a few weeks after the flower harvesting, similar results are obtained. Accordingly, the processing of a cut flower may be carried out before shipping, after shipping or after transportation (including import) of cut flowers.

Even when the restraint imposed by the outermost layer is released after full flowering, namely, after passing through the "Pre-Harvest Stage 6" in the flowering period, a flower having a similar appearance as described above can be obtained temporarily as the case may be, but the wounds in the incised portions are not cured, and wilting occurs in a short time; thus, such a later releasing as described above has a drawback and is not desirable in terms of the obdurability and longevity.

In the cultivation of a flowering plant and the processing of a cut flower, occurrence of the calyx splitting reduces the commercial value of the product, and is problematic for flower growers; thus, for carnation, for example, reinforcing such as taping has been adopted, but according to the present invention, a flowering plant and a cut flower each having a flower having a new appearance are obtained by releasing the restraint on the floral bud imposed by the outermost layer of the floral bud, and accordingly, the calyx splitting no longer causes a problem.

It is possible to obtain a flower flowering in multiple colors that are different between the petals in the central portion and the petals in the outer portion by releasing the restraint on the floral bud imposed by the outermost layer of the floral bud at the stage of being a floral bud by using the cultivation method and the processing method of the present invention.

This fact is compatible with the needs of the market demanding unique colors.

The reason for why the flower flowering in multiple colors is obtained is conceivably ascribable to the following insufficient pigmentation: in the flowering development, by nature, the petals open sequentially from the outer petals and accordingly the pigmentation occurs sequentially from the outer petals and hence the petals are colored sequentially from the outer petals; however, when the central portion of a floral bud is exposed to the outside world to be irradiated by sunlight, by releasing the restraint on the floral bud imposed by the outermost layer of the floral bud, insufficient pigmentation occurs in the petals in the central portion of the floral bud where pigmentation of the petals would occur by nature in the later stages.

For the purpose of obtaining a flower flowering in multiple colors, the timing for releasing the restraint on the floral bud imposed by the outermost layer of the floral bud is preferably set at the stage of being a floral bud and before the petals are exposed to the outside world.

Further, by selecting the timing for releasing the restraint on the floral bud imposed by the outermost layer of the floral bud, the proportion of the central portion of the floral bud to be exposed by the release from the restraint imposed by the outermost layer can be regulated, and hence there can be regulated the range where the exposure to the outside world to be irradiated by sunlight inhibits sufficient pigmentation, and consequently the coloration ratio of the flower can also be varied. In other words, the release from the restraint imposed by the outermost layer in an earlier stage makes wider the range where the sufficient pigmentation is inhibited.

When the method of the present invention is applied to a flowering plant that has originally one color, there is obtained a flower flowering in two colors in which flower the colors of the petals are different between the central portion and the outer portion; alternatively, when applied to a flowering plant that has originally two colors, there is obtained a flower flowering in three colors.

Conventionally, for the purpose of preventing the petals from damage in the transportation stage, a large proportion of the cut flowers are shipped from flower growers while the cut flowers are being floral buds, causing a problem such that flowering development is not sufficient or some other problems; however, petals are increased in thickness and hence in sturdiness by releasing the restraint on the floral bud imposed by the outermost layer of the floral bud, and consequently, it can be expected that petals will hardly be damaged in the transportation stage. Conceivably, it becomes possible to ship from the growers immediately before flowering or after flowering, and accordingly it becomes possible to prevent or reduce the dissipation of the energy for flowering, to be accompanied by an advantageous effect such that the longevity of flowers are improved.

Further, it can be expected to attain an advantageous effect such that the cultivation method and the processing method of the present invention make slightly thicker and sturdier the upper portion of the flower stalk to which the flower is connected as compared to common cultivation methods.

The flowering plant according to the present invention is obtained by the cultivation method of a flowering plant according to the present invention. Specifically, the flowering plant according to the present invention undergoes the "release flowering" by being released from the restraint on the floral bud imposed by the outermost layer of the floral bud and undergoes the flower color variation by the virtue of the above described cultivation method of a flowering plant according to the present invention.

Another flowering plant according to the present invention is a chlamydeous flowering plant in which the restraint on the floral bud imposed by the outermost layer of the floral bud is released. This flowering plant can be preferably obtained by the cultivation method of a flowering plant of the present invention, but the cultivation method is not necessarily limited to the method of the present invention.

For storing of cut flowers for the purpose of implementing the processing method of the present invention, just watering is good enough, but a fertilizer or a nutritional supplement may be applied.

The cut flower according to the present invention is obtained by the above described processing method of a cut flower according to the present invention. Specifically, the cut flower according to the present invention undergoes the "release flowering" by being released from the restraint on the floral bud imposed by the outermost layer of the floral bud and undergoes the flower color variation by the virtue of the above described processing method of a cut flower according to the present invention.

The cut flower according to the present invention is released from the restraint on the floral bud imposed by the outermost layer of the floral bud, and hence has the petals that are already dried to some extent as compared to cut flowers obtained from common cultivation methods, and the cut flower according to the present invention is more suitable for processing into dry flowers.

Another cut flower according to the present invention is a chlamydeous cut flower in which the restraint on the floral bud imposed by the outermost layer of the floral bud is released. This cut flower can be preferably obtained by the processing method of a cut flower of the present invention, but the processing method is not necessarily limited to the method of the present invention.

EXAMPLES

Example 1

In Example 1, a standard-flowering carnation variety "Zonne" was used. The original petal color of this variety is monochromatically pink (see FIGS. 6 to 8).

The cultivation conditions were such that a greenhouse was used and the cultivation temperature was from 12° C. to 15° C.

Figure 3:
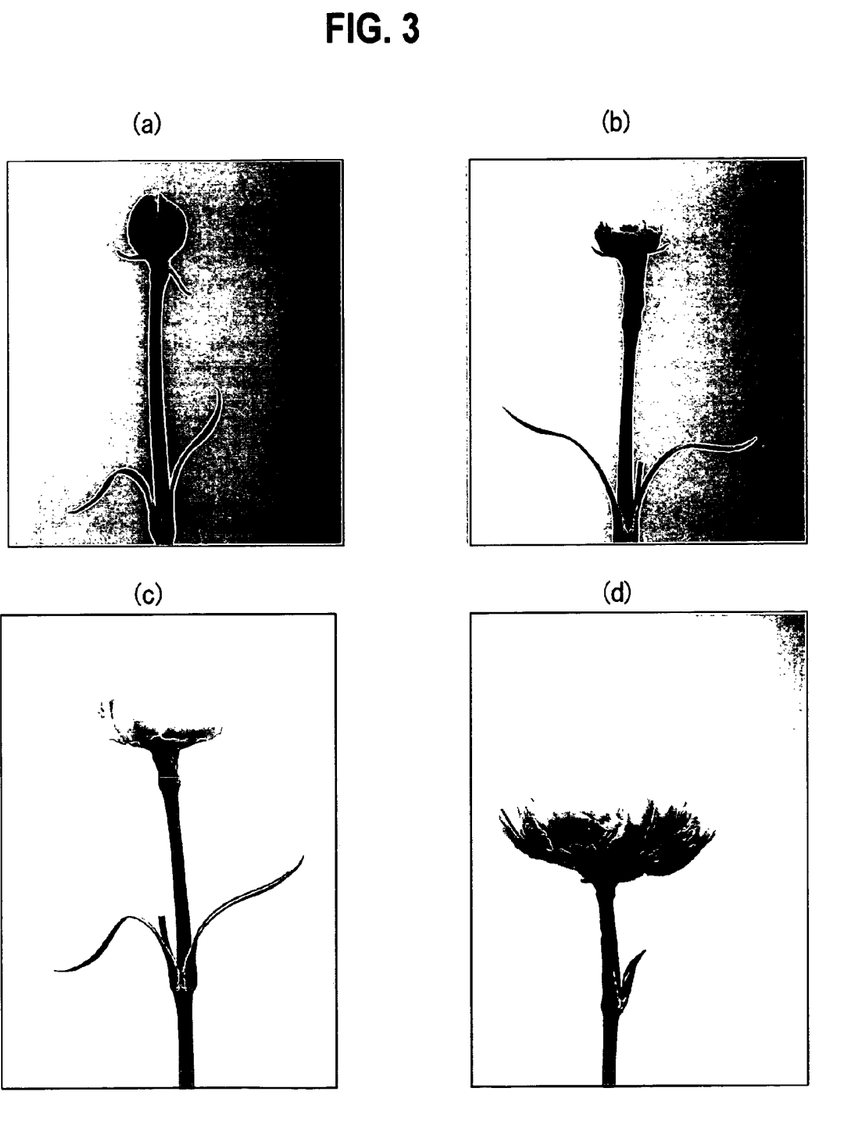
FIG. 3 shows lateral views showing the flowering development of a flower as a function of time in a case where sepal lobes are removed (at the stage (b)) in Example 1.
Figure 5:
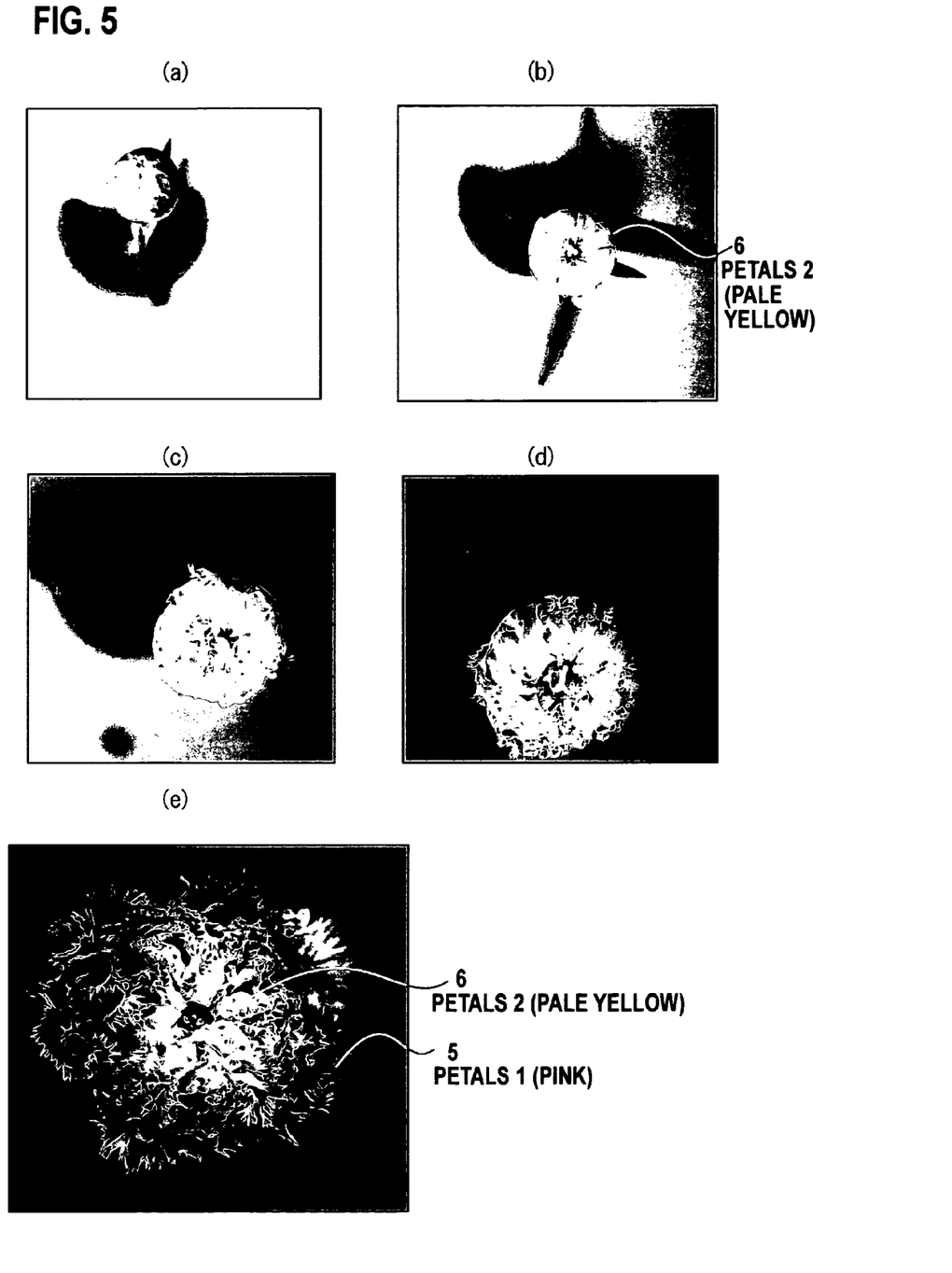
FIG. 5 shows overhead views showing the flowering development of the flower of FIG. 3 as a function of time.

FIG. 3(*a*) and FIG. 5(*a*) each show a floral bud at 20 days after the floral bud initiation. Each of these floral buds was subjected to the removal of all the sepal lobes at the stage of 25 days (FIG. 3(*b*) and FIG. 5(*b*)) after the floral bud initiation.

The tool used for the removal was a tweezer-like or hair tweezer-like tool; specifically, used was a pair of tweezers for removing bones from fish that was modified by machining the flat edges thereof into slant edges for the purpose of removing only sepal lobes without damaging the petals or the like located inside.

At this stage, pigmentation did not yet occur in the petals, and the petals were pale yellow (6 petals 2 (pale yellow)).

At the stage of 30 days (FIG. 3(*c*) and FIG. 5(*c*)) after the floral bud initiation, the petals started to open without being constricted by the calyx. At this stage, the petals did not yet undergo pigmentation and were still pale yellow.

At 35 days (FIG. 3(*d*) and FIG. 5(*d*)) after the floral bud initiation, the petals opened more widely. At this stage, the petals of the central portion did not yet undergo pigmentation and remained pale yellow, but only the outer petals started to be colored in pink.

Figure 4:
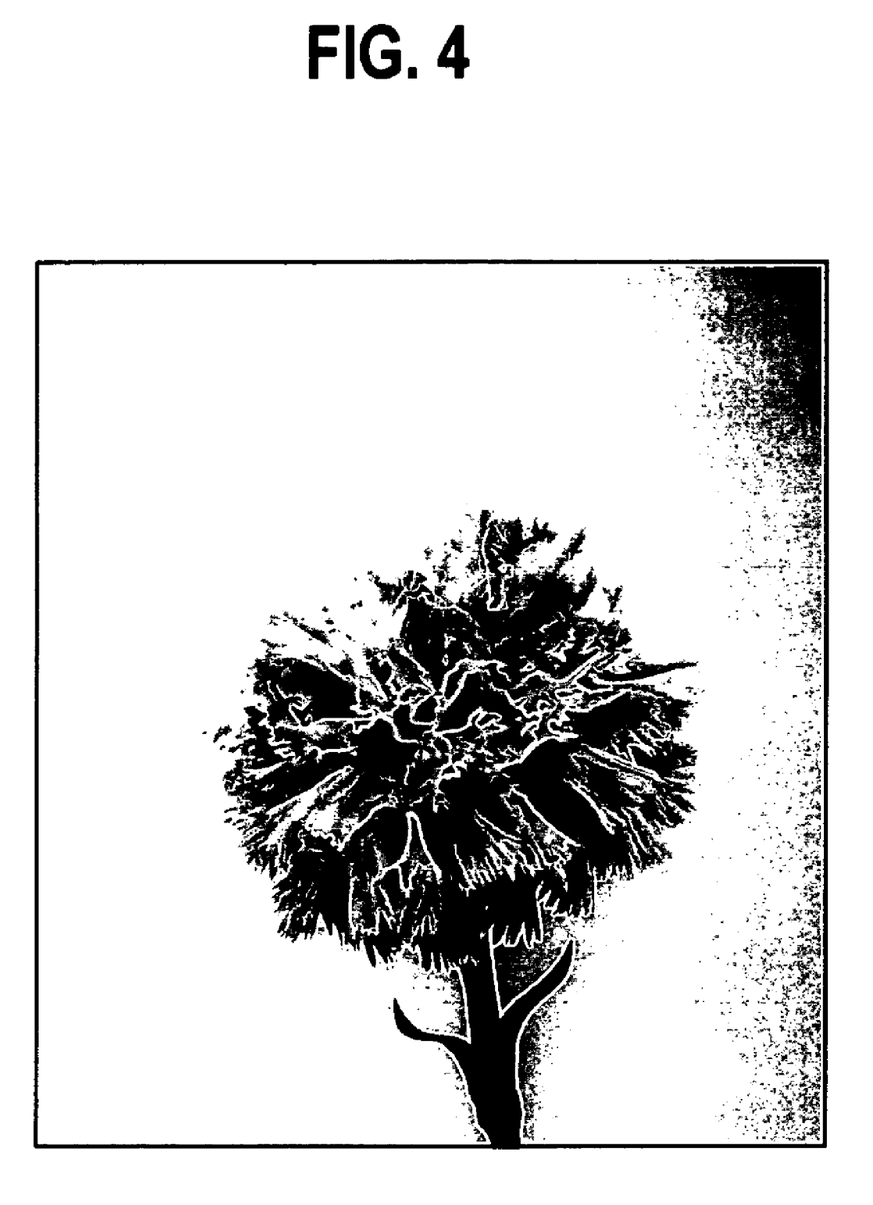
FIG. 4 shows a lateral view of the flowering state of the flower of FIG. 3.

At the stage of 45 days (FIG. 4 and FIG. 5(*e*)) after the floral bud initiation, the petals opened widely, and thus there was obtained a "release flowering" carnation flowering in two colors with the pale yellow petals (6 petals 2 (pale yellow)) in the central portion and the pink outer petals (5 petals 1 (pink)).

Comparative Example 1

In the same manner as in Example 1, a standard-flowering carnation variety "Zonne" was used and made to bloom without removing the sepal lobes of the carnation variety.

The cultivation conditions were such that a greenhouse was used and the cultivation temperature was from 12° C. to 15° C.

Figure 8:
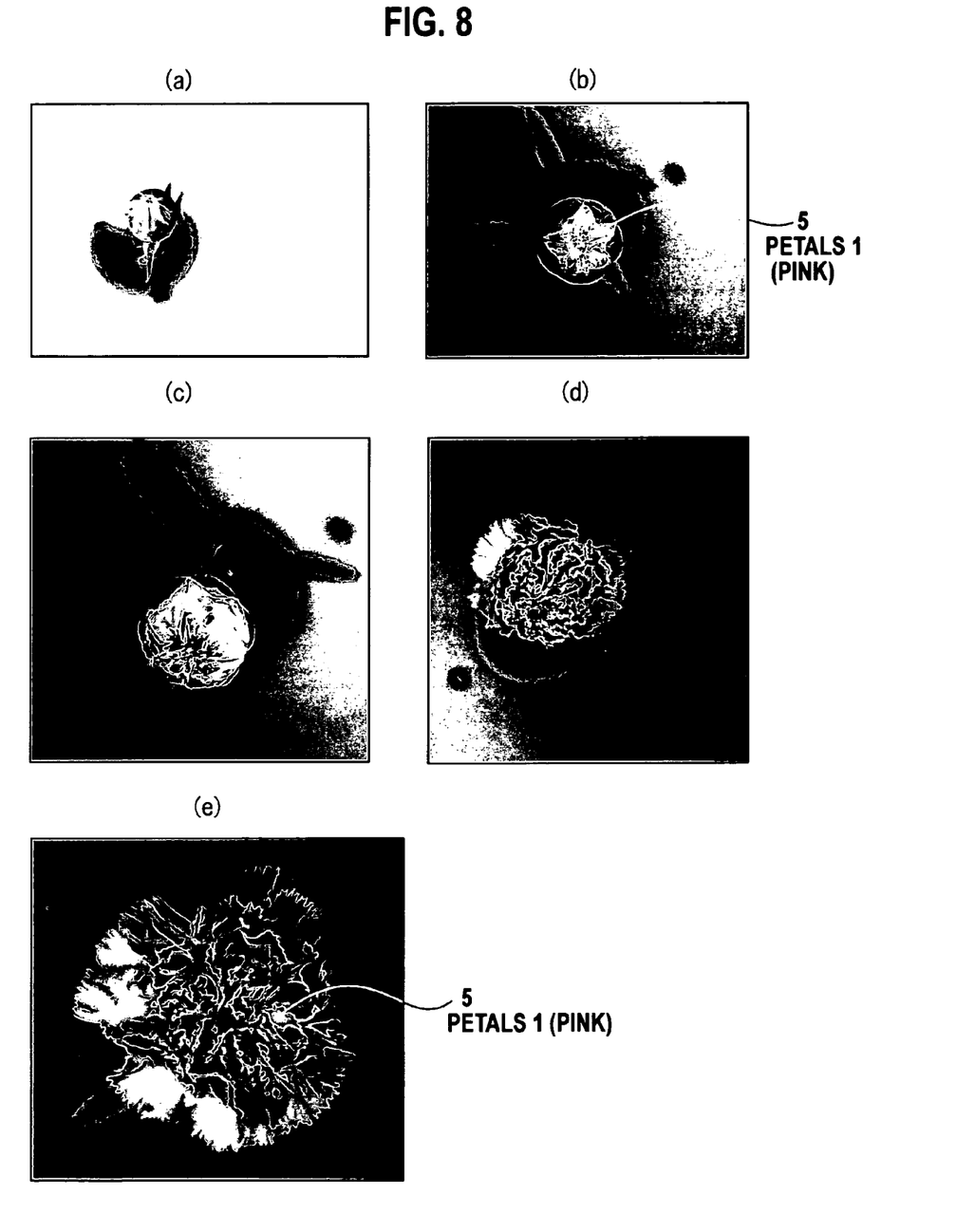
FIG. 8 shows overhead views showing the flowering development of the flower of FIG. 6 as a function of time.

FIG. 6(a) and FIG. 8(a) each show a floral bud at 20 days after the floral bud initiation. The sepal lobes of each of these floral buds were not yet removed at the stage of 25 days (FIG. 6(b) and FIG. 8(b)) after the floral bud initiation, and all the sepal lobes were left. At this stage, each of the floral buds started to open, and the portions exposed to the outside world of the petals already underwent pigmentation and the color of the exposed portions was pink (5 petals 1 (pink)).

At the stage of 28 days (FIG. 6(c) and FIG. 8(c)) after the floral bud initiation, the petals started to open while still being constricted by the calyx. At this stage, the color of the petals was monochromatically pink.

At the stage of 30 days (FIG. 6(d) and FIG. 8(d)) after the floral bud initiation, the petals further opened while still being constricted by the calyx. Even at this stage, the color of the petals was monochromatically pink.

At the stage of 40 days (FIG. 7 and FIG. 8(e) after the floral bud initiation, the flower was made to bloom while the petals were still being constricted by the calyx. As compared to the cases of Examples 1 (FIGS. 3 to 5), the petals did not open widely.

The color of the petals was of the original color, namely, monochromatically pink (5 petals 1 (pink)).

Example 2

In Example 2, a standard-flowering carnation variety "Ricordo" was used. The original petal color of this variety is monochromatically pink (see FIGS. 12 and 13).

Figure 9:
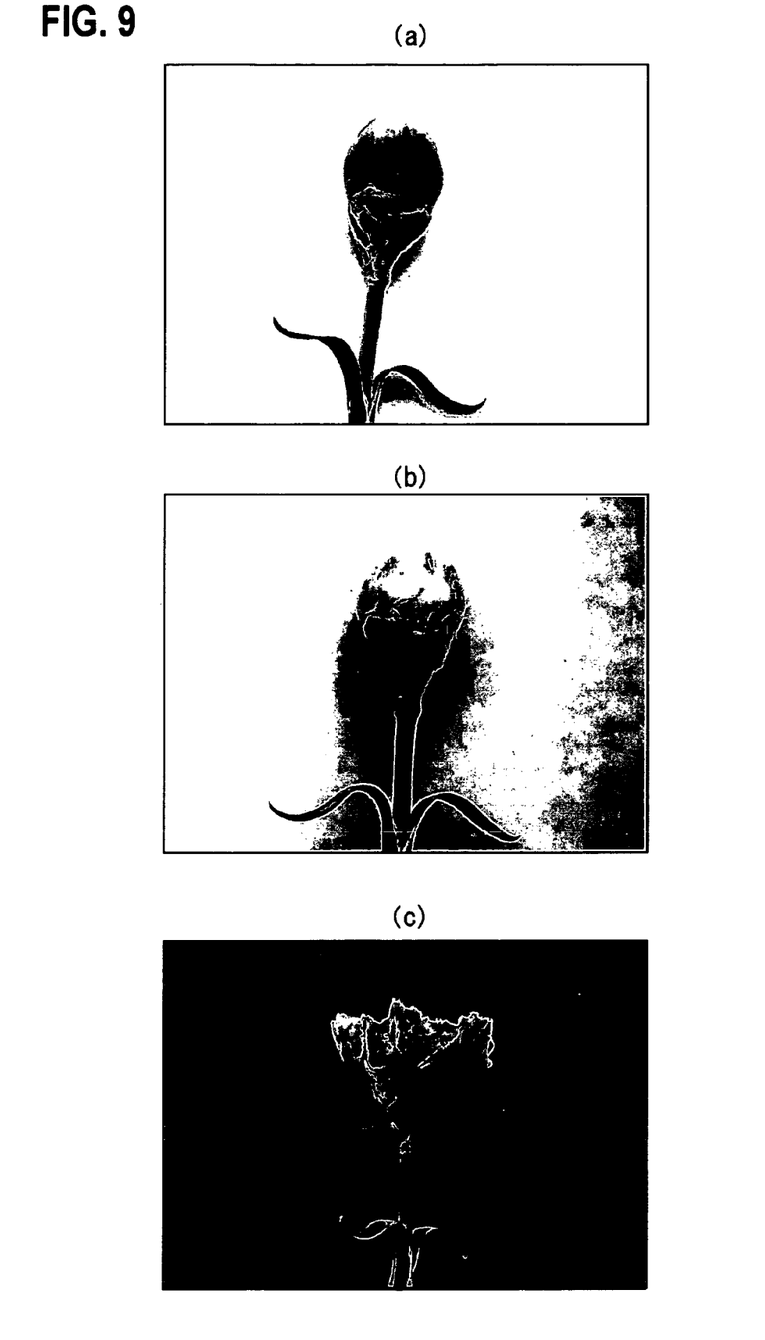
FIG. 9 shows lateral views showing the flowering development of a flower as a function of time in a case where sepal lobes are removed (at the stage (b)) in Example 2.
Figure 11:
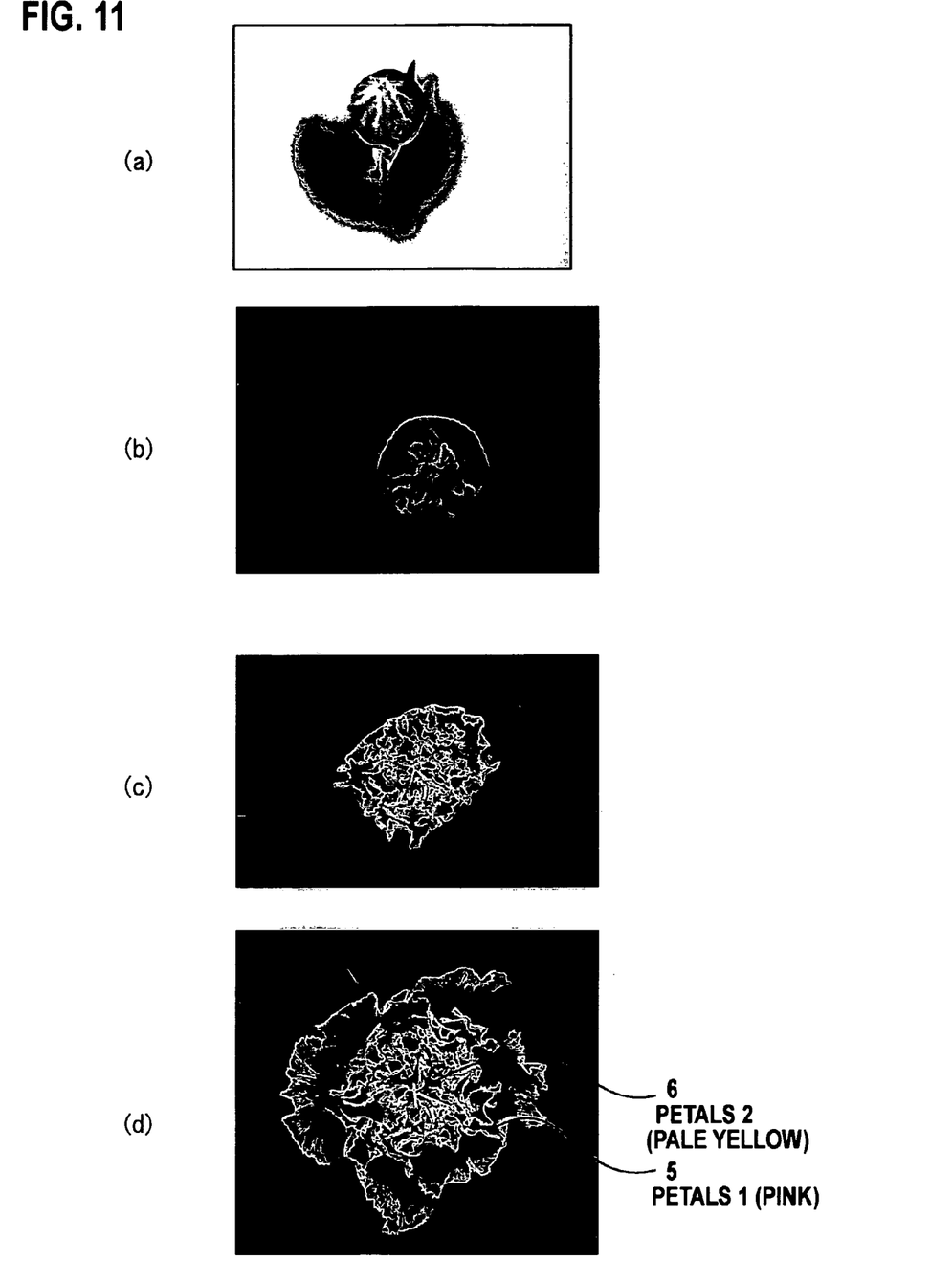
FIG. 11 shows overhead views showing the flowering development of the flower of FIG. 9 as a function of time.

FIG. 9(a) and FIG. 11(a) each show a floral bud at the time of flower harvesting carried out at two weeks after the floral bud initiation (floral budding). Each of these floral buds was subjected to the removal of all the sepal lobes at the stage of two weeks (FIG. 9(b) and FIG. 11(b)) after the floral budding.

The tool used for the removal was a tweezer-like or hair tweezer-like tool; specifically, used was a pair of tweezers for removing bones from fish that was modified by machining the flat edges thereof into slant edges for the purpose of removing only sepal lobes without damaging the petals or the like located inside.

At this stage, only the tips of the outer petals were colored in pink.

At the stage of 20 days (FIG. 9(c) and FIG. 11(c)) after the floral budding, the petals started to open without being constricted by the calyx. At this stage, the petals in the central portion did not yet undergo pigmentation and remained pale yellow, and only the outer petals started to be colored in pink.

Figure 10:
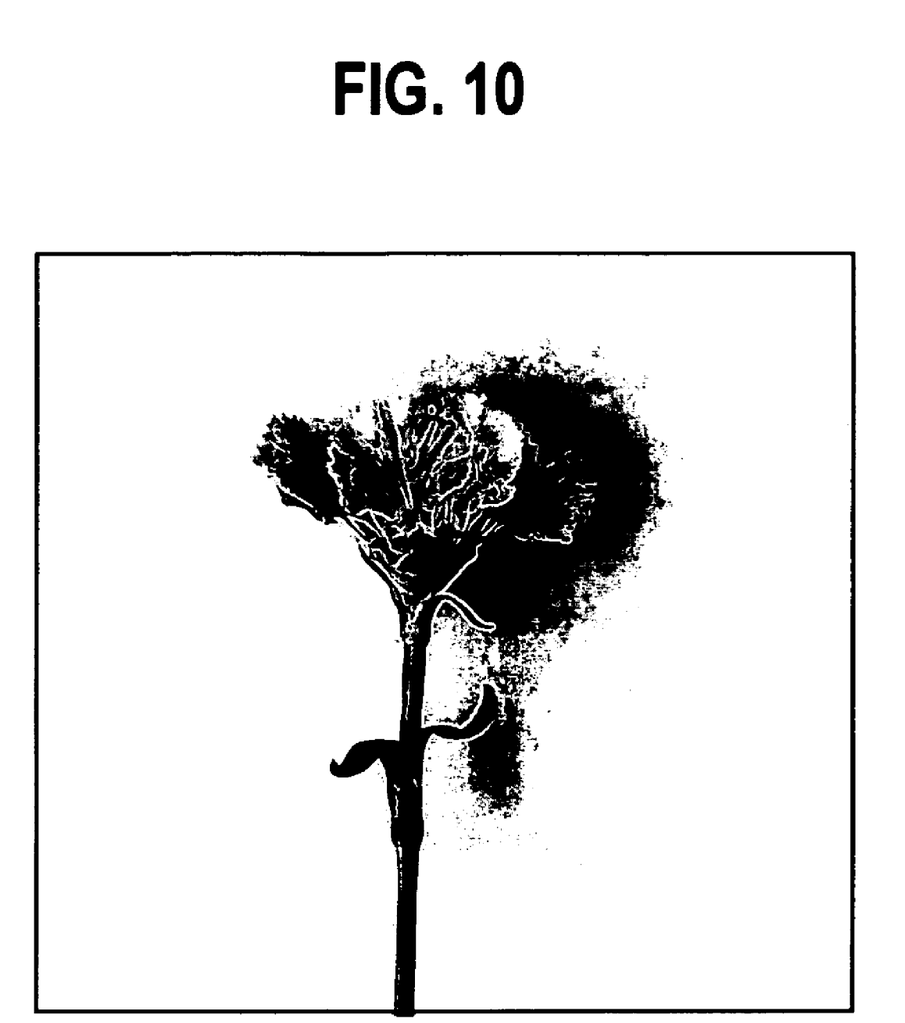
FIG. 10 shows a lateral view of the flowering state of the flower of FIG. 9.

At the stage of 25 days (FIG. 10 and FIG. 11(d)) after the floral budding, the petals opened widely, and thus there was obtained a "release flowering" carnation flowering in two colors with the pale yellow petals (6 petals 2 (pale yellow)) in the central portion and the pink outer petals (5 petals 1 (pink)).

Comparative Example 2

In the same manner as in Example 2, a standard-flowering carnation variety "Ricordo" was used and made to bloom without removing the sepal lobes of the carnation variety.

Figure 13:
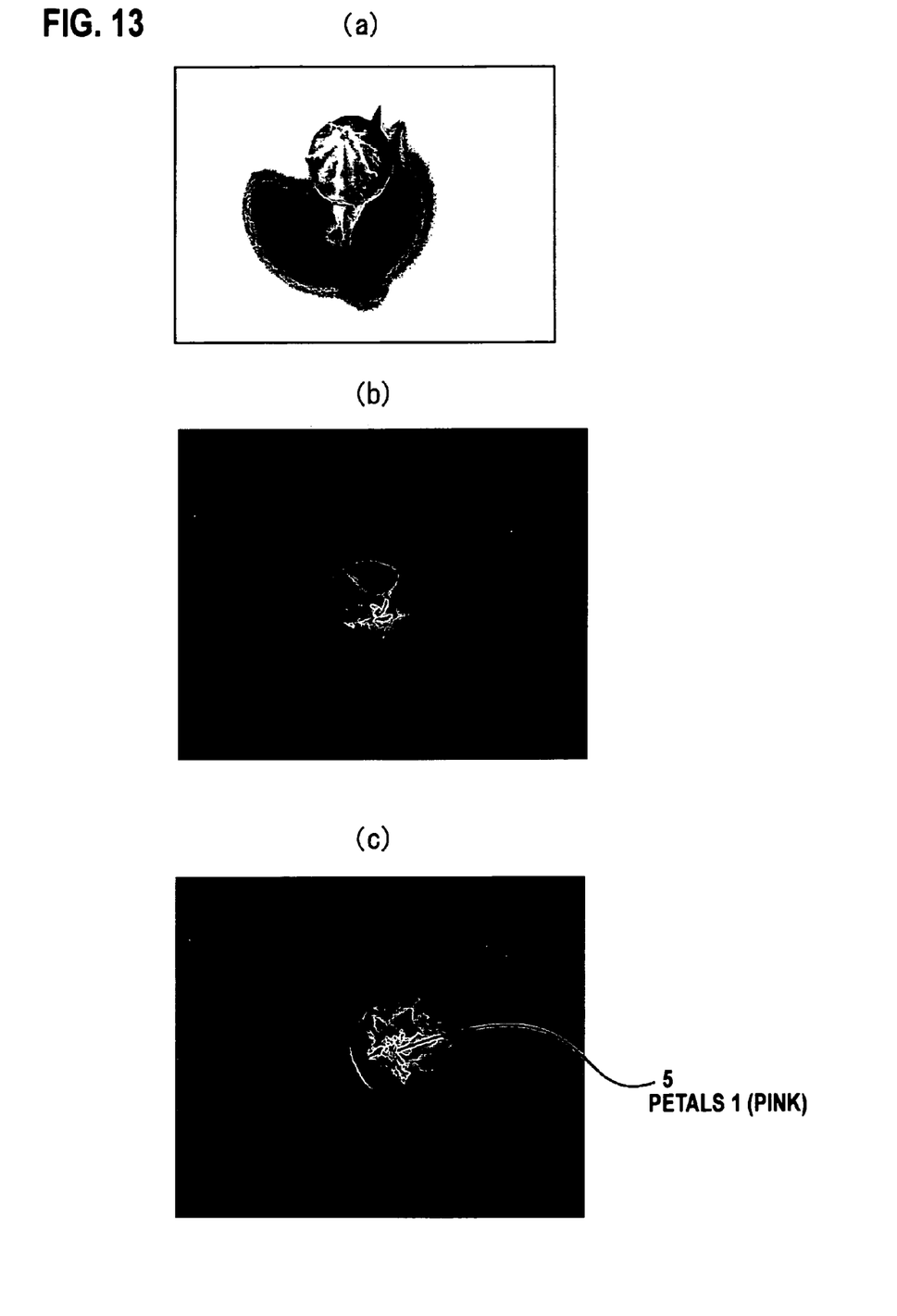
FIG. 13 shows overhead views showing the flowering development of the flower of FIG. 12 as a function of time.

FIG. 12(a) and FIG. 13(a) each show a floral bud at the time of flower harvesting carried out at two weeks after the floral bud initiation (floral budding). The sepal lobes of each of the floral buds were not removed at all, and all the sepal lobes were left.

At the stage of 20 days (FIG. 12(b) and FIG. 13(b)) after the floral budding, the floral bud started to open while still being constricted by the calyx. At this stage, the color of the petal portions exposed to the outside world already underwent pigmentation and was monochromatically pink.

At the stage of 25 days (FIG. 12(c) and FIG. 13(c)) after the floral budding, the petals further opened while still being constricted by the calyx. The petals did not open sufficiently as compared to the cases of Example 2 (FIGS. 9 to 11). The color of the petals was of the original color, namely, monochromatically pink (5 petals 1 (pink)).

The invention claimed is:

1. A cultivation method of a flowering plant comprising a step of releasing restraint on a floral bud imposed by outermost layer of the floral bud at a stage between immediately after floral bud initiation and flowering period to obtain a flowering plant having a released petal.

2. A processing method of a cut flower comprising a step of releasing restraint on a floral bud imposed by outermost layer of the floral bud at a stage between immediately after floral bud initiation and flowering period to obtain a cut flower having a released petal.

3. The cultivation method of a flowering plant according to claim 1, further comprising a step of cultivating the flowering plant.

4. The cultivation method of a flowering plant according to claim 1, further comprising a step of blooming the flowering plant.

5. The cultivation method of a flowering plant according to claim 1, wherein the flowering plant is provided to a flower market.

6. The cultivation method of a flowering plant according to claim 1, wherein the flowering plant is selected from the group consisting of Caryophyllaceae, Rosaceae, Compositae and Theaceae families.

7. The cultivation method of a flowering plant according to claim 1, wherein the flowering plant is selected from the group consisting of *Dianthus, Rosa, Dahlia, Paeonia, Camellia, Anemone* and *Ranunculus* genera.

8. The cultivation method of a flowering plant according to claim 1, wherein the flowering plant is carnation.

9. The processing method of a cut flower according to claim 2, further comprising a step of watering the cut flower to store.

10. The processing method of a cut flower according to claim 2, further comprising a step of blooming the cut flower.

11. The processing method of a cut flower according to claim 2, wherein the cut flower is provided to a flower market.

12. The processing method of a cut flower according to claim 2, wherein the cut flower is selected from the group consisting of Caryophyllaceae, Rosaceae, Compositae and Theaceae families.

13. The processing method of a cut flower according to claim 2, wherein the cut flower is selected from the group consisting of *Dianthus, Rosa, Dahlia, Paeonia, Camellia, Anemone* and *Ranunculus* genera.

14. The processing method of a cut flower according to claim 2, wherein the cut flower is carnation.

* * * * *